United States Patent [19]
Lin

[11] Patent Number: 5,479,590
[45] Date of Patent: Dec. 26, 1995

[54] ANTI-ALIASING METHOD FOR POLYNOMIAL CURVES USING INTEGER ARITHMETICS

[75] Inventor: Tao Lin, Freemont, Calif.

[73] Assignee: Sierra Semiconductor Corporation, San Jose, Calif.

[21] Appl. No.: 302,041

[22] Filed: Sep. 7, 1994

Related U.S. Application Data

[63] Continuation of Ser. No. 56,947, May 5, 1993, abandoned, which is a continuation of Ser. No. 812,946, Dec. 24, 1991, abandoned.

[51] Int. Cl.⁶ .................................................. G06T 11/00
[52] U.S. Cl. ...................... 395/133; 395/142; 395/129; 395/132
[58] Field of Search .................................. 395/150, 151, 395/140–143, 425, 126, 127, 128, 129, 131, 132; 345/136, 137, 138, 147; 358/525

[56] References Cited

U.S. PATENT DOCUMENTS

| | | | |
|---|---|---|---|
| 4,586,037 | 4/1986 | Rosener et al. | 340/728 |
| 4,672,369 | 6/1987 | Preiss et al. | 340/728 |
| 4,704,605 | 11/1987 | Edelson | 340/728 |
| 4,796,020 | 1/1989 | Budrikis et al. | 340/723 |
| 4,808,984 | 2/1989 | Trueblood et al. | 340/723 |
| 4,843,380 | 6/1989 | Oakley et al. | 340/723 |
| 4,907,282 | 3/1990 | Daly et al. | 395/150 X |
| 4,908,780 | 3/1990 | Priem et al. | 340/728 X |

OTHER PUBLICATIONS

Foley et al. "Computer Graphics Principles and Practice" (1990), pp. 72–91, 612, 613, 132–143.

*Primary Examiner*—Almis R. Jankus
*Attorney, Agent, or Firm*—Burns, Doane, Swecker & Mathis

[57] ABSTRACT

A method of performing anti-aliasing on polynomial curves using only integer arithmetic. The anti-aliasing method includes the steps of: defining an polynomial equation of a curve, dividing grid units into an finite number of sub-intervals, associating a mix ratio to each of the sub-intervals, determining which sub-interval the curve bisects, assigning a mix ratio to each picture element bordering the grid unit according to the mix ratio associated with the sub-interval determined to be bisected by the curve.

4 Claims, 5 Drawing Sheets

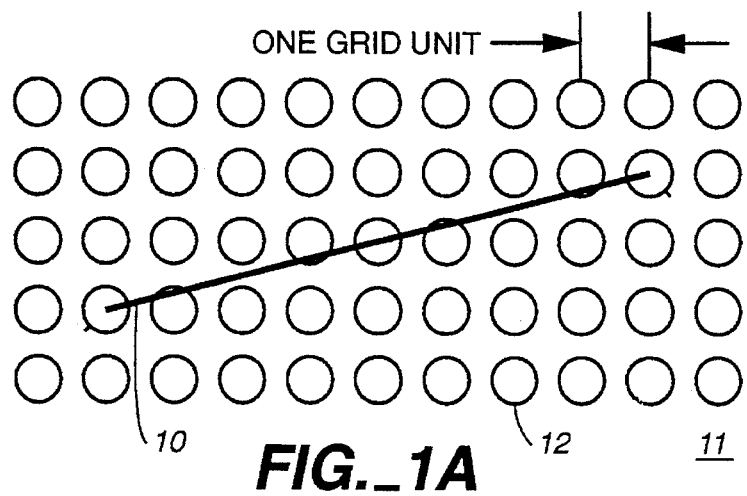
FIG._1A
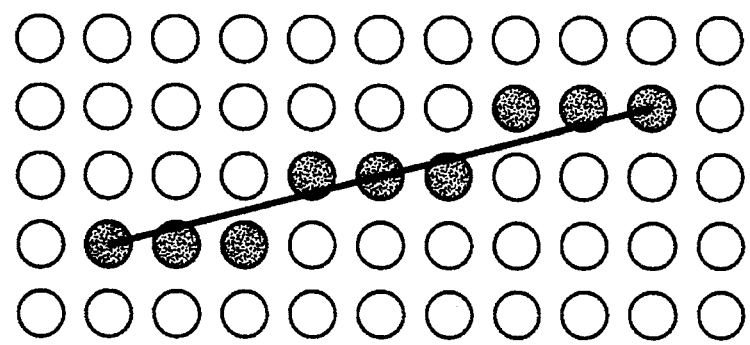
FIG._1B
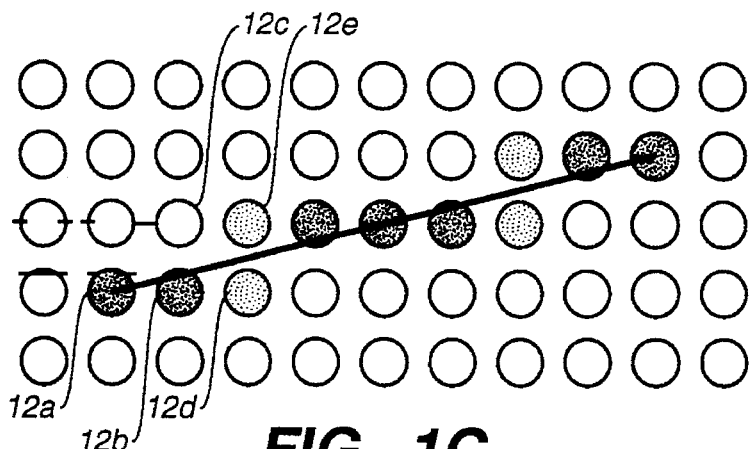
FIG._1C
(Prior Art)

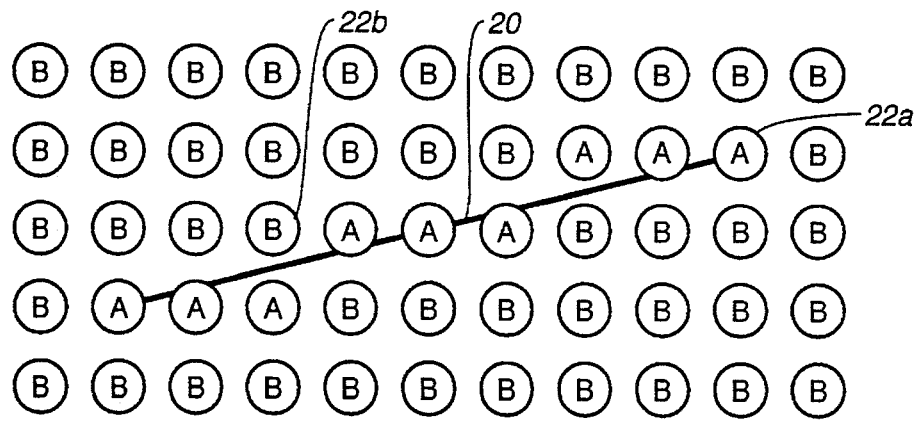
FIG._2A
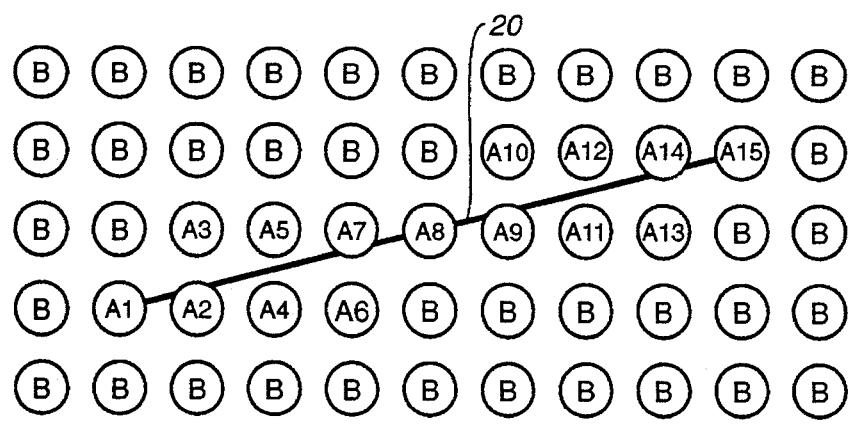
FIG._2B
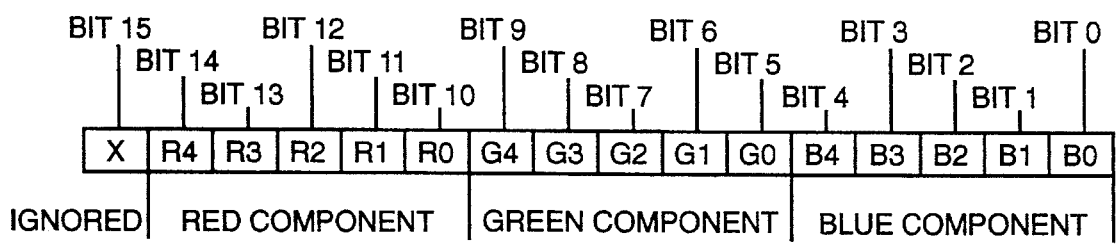
FIG._3

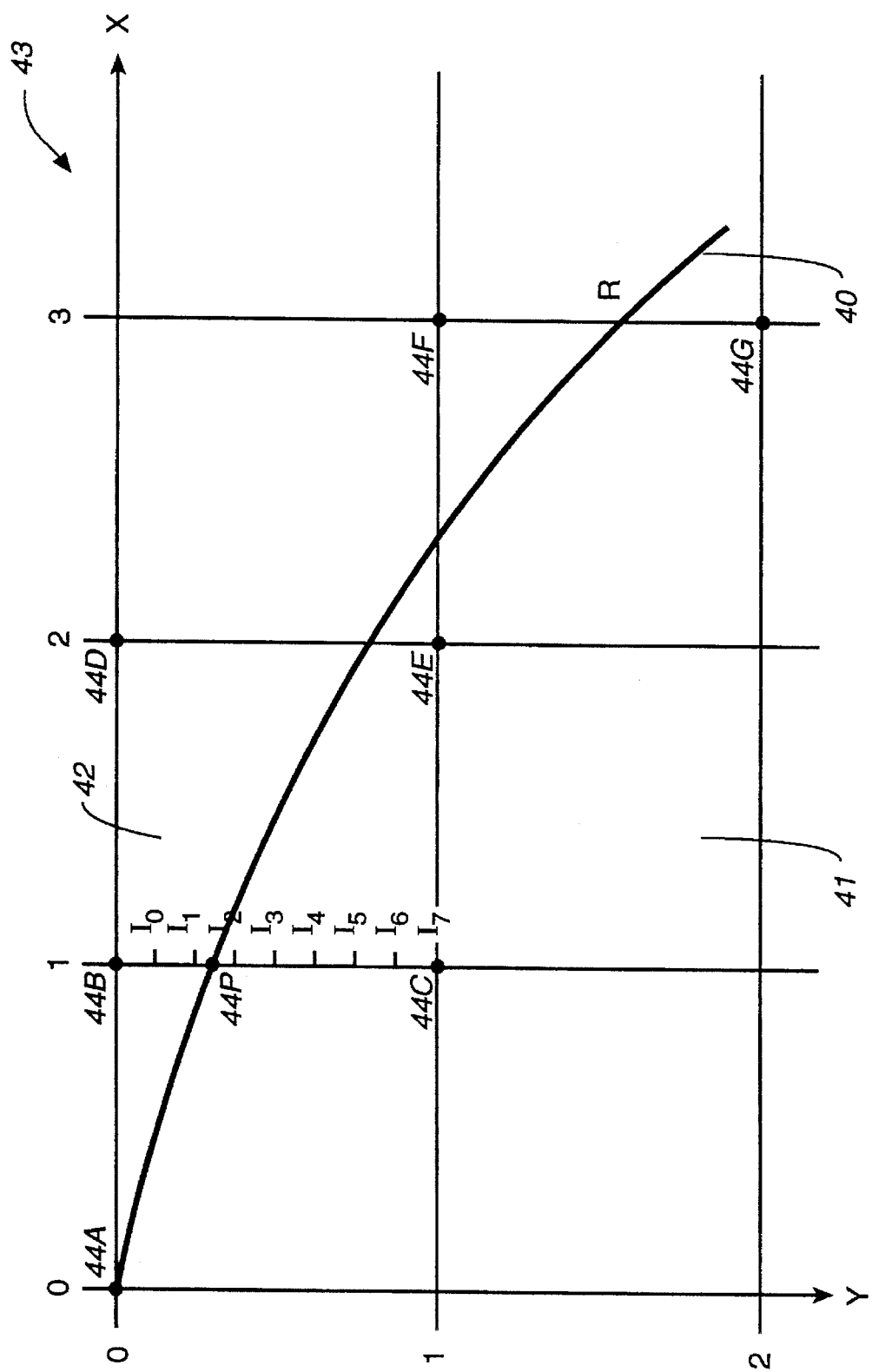
FIG._4

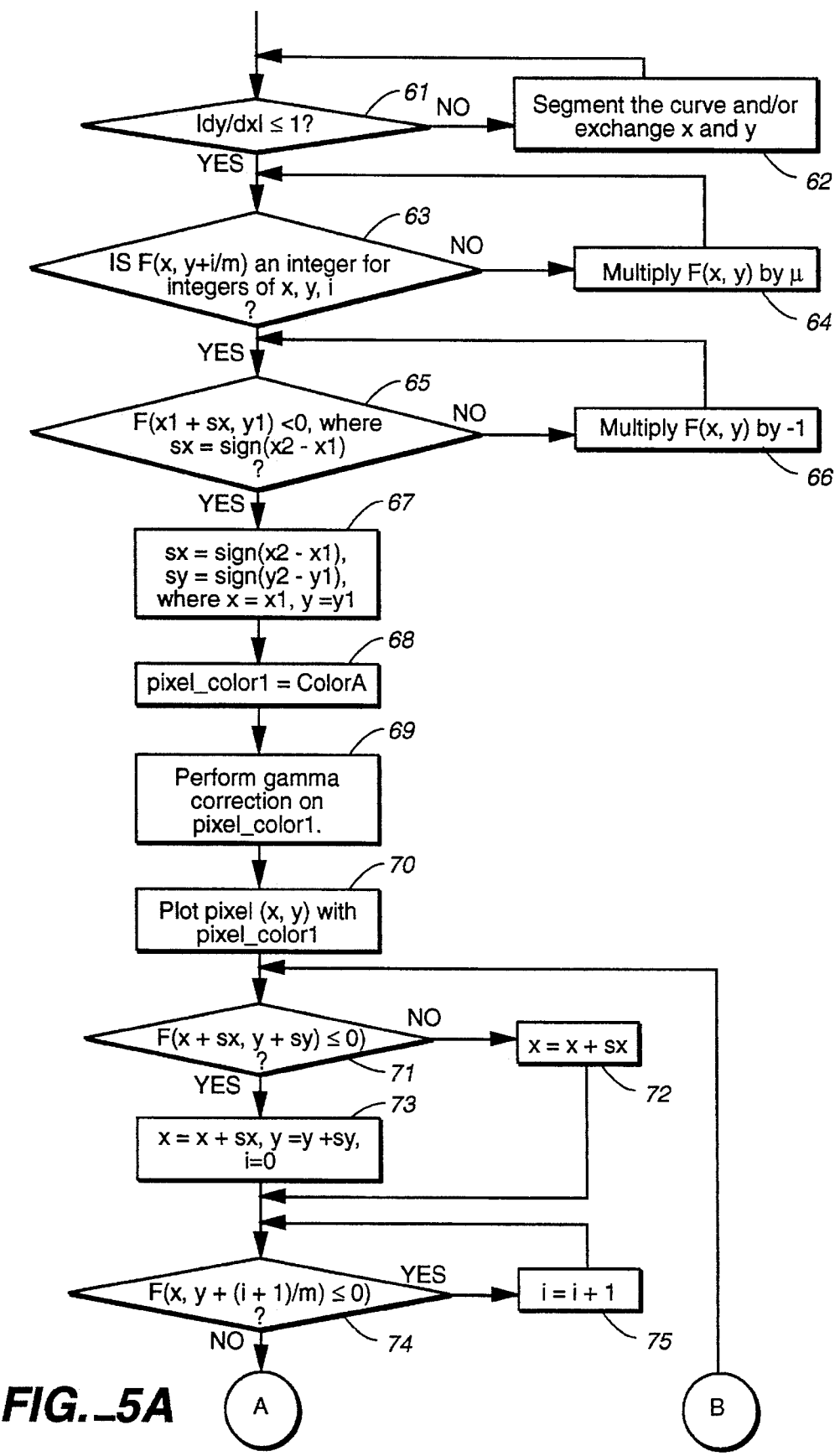
FIG._5A

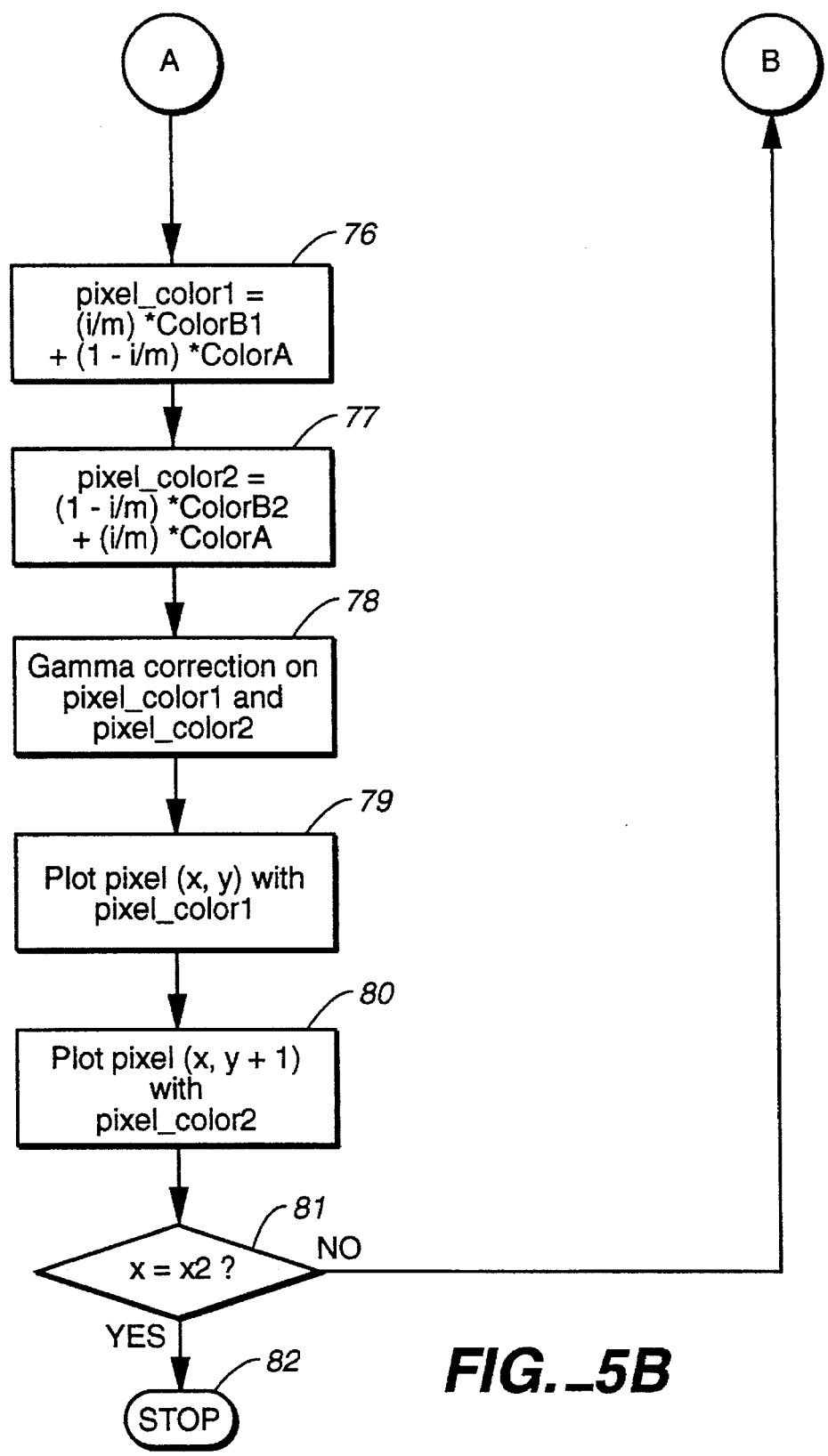
FIG._5B

5,479,590

1

ANTI-ALIASING METHOD FOR POLYNOMIAL CURVES USING INTEGER ARITHMETICS

This application is a continuation of application Ser. No. 08/056,947, filed May 5, 1993, now abandoned, which is a continuation of application Ser. No. 07/812,946, filed Dec. 24, 1991, now abandoned.

BACKGROUND OF THE INVENTION

1. Field of the Invention

The present invention relates to methods for minimizing distortions caused by aliasing in computer-generated graphic display systems that employ cathode ray tube displays.

2. Background of the Invention

Cathode ray tube (CRT) display devices operate by scanning an electron beam rapidly back and forth across a screen to illuminate discrete picture-element locations, or "pixels", along the horizontal scan lines. The horizontal scan lines are organized by synchronizing signals, with each frame containing a fixed number (e.g., 525) of visible horizontal scan lines and retrace lines. The net effect of a complete series of scans is to produce a snapshot-like "frame" that contains video data as to the state of each pixel location on each scan line. (FIG. 1A shows, for example, a 5×11 pixel grid that comprises a small portion of a complete frame of video information.) The frames are reproduced at a standard rate (e.g., sixty frames per second).

In practice, it is not possible to draw a perfectly continuous curve with a CRT device. As an example, FIG. 1A shows a continuous non-horizontal curve 10 which is not aligned with either the columns or rows of pixels in the grid. When such a curve is approximated on a CRT screen, discontinuities or "jaggies" can be observed along the curve. This phenomena—which is known as aliasing—is shown in FIG. 1B where the curve 10 is approximated as a series of staircase-like structures.

Various anti-aliasing technique have been suggested. For example, as shown in FIG. 1C, selected pixels can be only partially illuminated so that a jagged curve can be made to look smooth to the human eye. In this example, a starting pixel 12A is fully illuminated because the curve 10 is exactly aligned with the starting pixel 12A. The curve 10 then goes between other pixels 12B and 12C but not in exact alignment with the center of either of the other pixels 12B or 12C. The distances from the curve 10 to the centers of other pixels 12B and 12C equal 2/8 grid units and 6/8 grid units, respectively, in FIG. 1C. Therefore, pixel 12B and 12C are illuminated to an intensity of 75 percent (6/8) and 25 percent (2/8), respectively, of their full scale intensity. Similarly, the distances from the curve 10 to the centers of still other pixels 12D and 12E are both 4/8 grid units and consequently these pixels 12D and 12E are both illuminated at 50 percent of their full scale intensity. In this way, the anti-aliasing technique blurs the edges of the curve 10 to obtain smooth edge graphics. The above distances are selected to be even fractions of grid units for convenience of illustration but likely involve less convenient numbers.

When employing a color CRT display, conventional anti-aliasing technique becomes even more complicated. As shown in FIG. 2A, if a curve 20 with color A is drawn on a background of color B without anti-aliasing, the pixels 22 are assigned either color A (the curve color) or color B (the background color). Because of the discreet nature of the color pixels 22 on the screen, jaggies are inevitable on

2 typical CRT screens. Using an anti-aliasing technique, as shown in FIG. 2B, the pixels surrounding the curve 20 are assigned color values $A_1, A_2, \ldots$ etc. These color intensities $A_1, A_2, \ldots$ etc. are a mix of the curve color A with background color B according to the equation:

$$A_i = (1-p_i)*A + p_i*B$$

where $p_i$ is the mix ratio determined by the distance between a pixel center and the curve 20 with the mixed colors, the curve 20 looks smooth to a human eye.

In the prior art, the basic technique to implement anti-aliasing involves finding distances between pixel centers and a curve and then using the distances for determining mix ratios. Some more sophisticated techniques involve finding the overlap area of a curve with certain width and a pixel area and then using the overlap area for determining mix ratios. Most anti-aliasing methods use floating point arithmetics to find the distance, but such operations have several drawbacks. For example, such operations usually require expensive math co-processors and other specialized circuitry.

SUMMARY OF THE INVENTION

Generally speaking, the present invention to present a method of performing anti-aliasing on polynomial curves using only integer arithmetic. The method can be applied to polynomial curves including lines (linear curves), conic curves (circles and ellipses) and cubic curves.

In implementing the method of the present invention, it assumed that a finite number of different mix ratios are available. For instance, the available mix ratios, p, might be:

$$p=0/8, 1/8, 2/8, 3/8, 4/8, 5/8, 6/8, \text{ and } 7/8.$$

Further in implementing the method of the present invention, the determination of the exact distance between the intermediate point and a second pixel need not be determined but one only to divide the interval between pixels (i.e., the grid unit) into a finite number of sub-intervals and assigning an intensity value or mix ratio to the pixel according to the sub-interval in which the curve crosses.

The present invention employs a method of anti-aliasing a curve on a CRT monitor including the steps of: defining an polynomial equation of a curve, dividing grid units into an finite number of sub-intervals, associating a mix ratio to each of the sub-intervals, determining which sub-interval the curve bisects, assigning a mix ratio to each picture element bordering the grid unit according to the mix ratio associated with the sub-interval determined to be bisected by the curve.

The method of the present invention has application in both monochrome and color monitors and the mix ratio may be a simple gray level or a color mix.

BRIEF DESCRIPTION OF THE DRAWINGS

The present invention can be further understood with reference to the following description in conjunction with the appended drawings, wherein like elements are provided with the same reference numerals. In the drawings:

FIG. 1A shows a pixel grid;

FIG. 1B show a a straight line 10 which is approximated as a series of staircase-like structures.

FIG. 1C shows a prior art anti-aliasing technique;

FIG. 2A shows aliasing on a color monitor;

FIG. 2B shows the effect of anti-aliasing on a color monitor;

FIG. 3 shows the color format of HiColorDAC;

FIG. 4 is an example that illustrates the present invention; and

FIGS. 5A and 5B are a flow chart of the method of the present invention.

DETAILED DESCRIPTION OF THE PREFERRED EMBODIMENTS

The following describes a method for generating a curve 40 displayed on a grid structure 43 of CRT display screen. The curve is based upon a polynomial equation of its mathematical expression. In practice, the graphically-displayed curve may be less than a pixel width wide, but typically is more likely to be several pixel grid units wide. In the latter case, the below-described method addresses the edge of the curve.

As shown in FIG. 4, curve 40 is represented by a polynomial equation $F(x,y)=0$, whose coefficients are rational numbers. The region 42 above the curve 40 is represented by $F(x,y)<0$, while the region 41 below the curve 40 is represented by $F(x,y)>0$. The curve 40 starts from a first pixel 44A with coordinate (0,0). It is assumed that the absolute value of the derivative of x over y is less than or equal to 1 (i.e., $|dy/dx| \leq 1$), otherwise, the x and y terms are exchanged. Therefore, by moving one grid unit in an x direction, a point on the curve 40 will move by a fractional unit in the y direction to an intermediate point 44P between a second pixel 44B and a third pixel 44C. To find the distance between the intermediate point 44P and a second pixel 44B so that the mix ratio p for the second pixel 44B and third pixel 44C can be determined.

Initially, it can be assumed that there are a finite number of different mix ratio, i.e., p=0/8, 1/8, 2/8, 3/8, 4/8, 5/8, 6/8, 7/8, are available. The mix ratio may be a simple grayness level or a color mixture if a color monitor is utilized. Therefore, the method does not require the determination of the exact distance between the intermediate point 44P and a second pixel 44B, for example. The interval between the second and third pixels 44B and 44C, for example, is divided into 8 sub-intervals, e.g., $I_0, I_1, I_2, I_3, I_4, I_5, I_6$, and $I_7$. The total number m of intervals $I_m$ is arbitrary and is determined by the graphics system hardware capability, but is selected to be eight (m=8) for purposes of illustration.

Then, a determination is made of the sub-interval $I_i$ (where $I_i=(i/8, (i+1)/8)$ and $i \leq m$) to which the intermediate point belongs. This can be done by evaluating the polynomial equation $F(x,y)=0$ using all possible intermediate points in a curve F(0,0/8), F(0,1/8), F(0,2/8) ... F(0,6/8), F(0,7/8), F(0,8/8) to find i such that $$F(0,i/8) \leq 0 \text{ and } F(0,(i+1)/8)>0.$$

which guarantees that $P \in I_i$. As a result, the mix ratio is determined to be $P_i=i/8$.

Because F(x,y) is a polynomial with rational coefficients, a sufficiently large integer μ can be found such that the evaluation of $$\mu F(x,y+i/8)$$

involves only integer operation for integers x, y and i. Therefore, the assumption is made that F(x,y+i/8) is an integer for all integers x, y and i. Otherwise, F(x,y) is multiplied by μ.

Furthermore, the increment of F(x,y):

$$\Delta F_{\Delta x, \Delta y}(x,y)=F(x+\Delta x, y+\Delta y)-F(x,y)$$

is also a polynomial and is always one order lower than F(x,y). Therefore, after F(0,0) is calculated, to calculate F(0,1/8), it is only necessary to calculate $\Delta F_{0,1/8}(0,0)$ and then add it to F(0,0), and so on. In this way, computational burden can be further reduced because only a lower order polynomial needs to be evaluated.

After the mix ratio $P_i=i/8$ is found, a curve can be drawn with anti-aliasing. For example, if the curve $F(x,y)=0$ needs to be drawn with color A, the background colors on $F(x,y)<0$ side and $F(x,y)>0$ side of the curve are color B1 and color B2, respectively. Then, the pixel 44B will have the mixed color $$\text{pixel\_color}=p_i*\text{ColorB1}+(1-p_i)*\text{ColorA} \quad (1)$$

and the pixel 44C will have the mixed color $$\text{Pixel\_color2}=(1-p_i)*\text{ColorB2}+p_i*\text{ColorA} \quad (2)$$

In general, color B1, color B2, and color A are all color vectors with three components of red, green, and blue:

$$\text{ColorB1}=(\text{ColorB1}_r, \text{ColorB1}_g, \text{ColorB1}_b)$$

$$\text{ColorB2}=(\text{ColorB2}_r, \text{ColorB2}_g, \text{ColorB2}_b)$$

$$\text{ColorA}=(\text{ColorA}_r, \text{ColorA}_g, \text{ColorA}_b).$$

Therefore, the multiplications and additions in (1) or (2) must be performed on three components separately.

However, in the case when HiColor Palette is used, it is possible to perform the mixing color operation of (1) or (2) in only one step instead of three, as explained below.

As shown in FIG. 3, HiColor Palette uses 2 bytes to directly represent a pixel color with 5-bit each for red, green, and blue components and bit-15 ignored. For easy manipulation of mixing colors, the two most significant bits of R, G, B components, i.e., bits R4, R3, G4, G3, B4, B3, are used to define a color. The three least significant bits are used to obtain different percentages of the defined color. Therefore, 64 different colors can be defined and 8 different mix percentages are available. For example, if color X and color Y are given as follows

| X = | x | $R_4$ | $R_3$ | 0 | 0 | 0 | $G_4$ | $G_3$ | 0 | 0 | 0 | $B_4$ | $B_3$ | 0 | 0 | 0 |
|---|---|---|---|---|---|---|---|---|---|---|---|---|---|---|---|---|
| | | bit14–10 | | | | | bit9–5 | | | | | bit4–0 | | | | |

| Y = | x | $r_4$ | $r_3$ | 0 | 0 | 0 | $g_4$ | $g_3$ | 0 | 0 | 0 | $b_4$ | $b_3$ | 0 | 0 | 0 |
|---|---|---|---|---|---|---|---|---|---|---|---|---|---|---|---|---|
| | | bit14–10 | | | | | bit9–5 | | | | | bit4–0 | | | | | then, a mixed color $Z_i$ can be obtained by $$Z_i=p_i X+(1-p_i) Y.$$

In this case, the red, green, and blue components do not need to be handled separately. Therefore, the mixing color operation can be completed in a single step.

In the special case of a linear curve (i.e., a line) and eight mix ratios, the foregoing equation can be expressed $$Z_i = \frac{8-i}{8} *X + \frac{i}{8} *Y$$

where i=0, 1, 2, . . . 8.

To find the mix ratio P=p/8, the following criterion function is used:

$$e(x,y)=8 \ (x*dy-y*dx).$$

In this example, the coefficient 8 is used so that only integer operation is involved when the function is evaluated. Note that e(x,y)=0 if a point (x,y) is on a curve 40, e(x,y)>0 if a point (x,y) is on one side of the curve 40 and e(x,y)<0 if a point (x,y) is on another side of curve 40, as shown in FIG. 4.

One grid unit is divided into eight intervals as shown in the adjacent pixels 44B and 44C in FIG. 4. If the curve 40 passes between points (0,1) and (1,1/8), then the mix ratio is p=1/8. If the curve 40 passes between points (1,1/8) and (1,2/8), then the mix ratio is p=2/8. In general, if a curve 40 passes between points (1,(p−1)/8) and (1,p/8), then the mix ratio is p=p/8. Which interval through which the curve 40 will pass is determined by evaluating the criterion function. If $$e(1, (p-1)/8) \geq 0 \text{ and } e(1,p/8)<0$$

then the curve 40 passes between (1, (p−1)/8) and (1,p/8).

Because e(x,y) is a linear function, then $$\begin{aligned} e(x + \Delta x, y + \Delta y) &= e(x,y) + e(\Delta x, \Delta y) \\ &= e(x,y) + e(0,1/8) \\ &= e(x,y) - dx, \end{aligned}$$

and evaluation of the function can be performed incrementally and computation time can be reduced.

After the proper mixture of color $Z_i$ is found, gamma correction may be performed before the color values are sent to triple digital-to-analog converters (DACs, not shown) which drive the monitor. Gamma correction, which is conventional per se, is desirable because the luminous output of the phosphors of the CRT monitor screen has a nonlinear relation to the input value of the DAC. Gamma correction may be accomplished through conventional methods.

By following the flow chart of FIGS. 5A and 5B, a polynomial curve F(x,y)=0 can be drawn from point (x1, y1) to point (x2,y2) with anti-aliasing. The method includes a number of assumptions which, for all points (x,y) along the curve, are:

(1) |dy/dx|≦1 (Step 61). Otherwise, divide the curve into several sub-curves and exchange x and y (Step 62).

(2) A total of m different mix ratios are available.

(3) F(x,y+i/m) is integer for integers of x,y,i (Step 63). Otherwise, F(x,y) is multiplied by a sufficiently large integer (Step 64).

(4) F(x1+sx,y1)<0, where sx=signum (x2−x1) (Step 65). Otherwise, F(x,y) is multiplied by −1 (Step 66).

(5) The background colors on F(x,y)<0 side and F(x,y)>0 side of the curve are ColorB1 and ColorB2, respectively. The curve color is ColorA. ColorB1, ColorB2, and ColorA are all color vectors with three components: red, green, and blue.

(6) F(x1,y1)=0.

The method also involves a drawing procedure, which includes:

Procedure 1.

sx = signum (x2−x1), sy = signum (y2−y1),
X=x1, y=y1 (Step 67),
    pixel_color1 = ColorA (Step 68),
    perform gamma correction on pixel_color1 (Step 69).

Procedure 2.

plot pixel (x,y) with pixel_color1 (Step 70).

Procedure 3.

if F(x+sx,y+sy)≦0 (Step 71) then
        x=x+sx, y=y+sy, i=0 (Step 73)
    else
        x=x+sx (Step 72).

Procedure 4.

while F(x,y+(i+1)/m)≦0 (Step 74) do
        i=i+1 (Step 75).

Procedure 5.

pixel_color1 = (i/m)*ColorB1 + (1−i/m)*ColorA (Step 76),
    pixel_color2 = (1−i/m)*ColorB2 + (i/m)*ColorA (Step 77),
    perform gamma correction on pixel_color1 and pixel_color2 (Step 78),
    plot pixel (x,y) with pixel_color1 (Step 79),
    plot pixel (x,y+1) with pixel-color2 (Step 80).

Procedure 6.

if x=x2 (Step 81) then
        stop (Step 82)
    else
        go to Procedure 3 (Step 71).

The foregoing has described the principles, preferred embodiments and modes of operation of the present invention. For example, the colors may be expressed in other color space models instead of the RGB model. Accordingly, the present invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A computer graphics rendering process for displaying on a raster scan computer display having a limited resolution of H×V pixels an analytical curve that passes between centers of a pair of adjacent pixels in display space without intersecting the center of either pixel, the analytical curve to be displayed in a first shade or color on a background field displayed in one or more other shades or colors, comprising the steps of:

selecting a plurality of equidistant points along a line segment joining said adjacent pixels, said plurality of equidistant points including end points, defined by said adjacent pixels, of said line segment;

evaluating an analytic expression, defining said analytic curve, at a plurality of said equidistant points;

identifying, from among N ordinal pairs of adjacent ones of said plurality of equidistant points, an Mth pair between which said analytic curve passes;

assigning to each of said adjacent pixels, in accordance with the ratio M/N+1, a display shade or color that is a ratiometric combination of said first shade or color and another shade or color and that is different from both said first shade or color and said another shade or color;

displaying said adjacent pixels in their respective assigned shades or colors; and repeating the foregoing steps for multiple such pairs of adjacent pixels.

2. The method of claim 1, wherein said evaluating step involves only integer arithmetic.

3. The method of claim 2, wherein said assigning step comprises:

for each of a plurality of color components, separately determining a ratiometric combination of a particular color component of said first color and a same particular color component of said another color.

4. The method of claim 2, wherein colors are represented in a single word format, and wherein said assigning step comprises:

simultaneously determining a ratiometric combination of said first color and said another color with respect to a plurality of color components.

* * * * *